Jan. 23, 1968  R. F. MILES  3,365,070

STACKABLE GRAVITY FLOW STOCK BIN

Filed Sept. 24, 1965  6 Sheets-Sheet 1

INVENTOR
ROBERT F. MILES,

BY Yungblut, Melville, Strasser and Foster
ATTORNEYS

Jan. 23, 1968   R. F. MILES   3,365,070
STACKABLE GRAVITY FLOW STOCK BIN
Filed Sept. 24, 1965   6 Sheets-Sheet 2

INVENTOR
ROBERT F. MILES,

BY Yungblut, Melville, Strasser and Foster
ATTORNEYS

Jan. 23, 1968  R. F. MILES  3,365,070
STACKABLE GRAVITY FLOW STOCK BIN
Filed Sept. 24, 1965  6 Sheets-Sheet 4

INVENTOR
ROBERT F. MILES
BY Yungblut, Melville, Strasser and Foster
ATTORNEYS

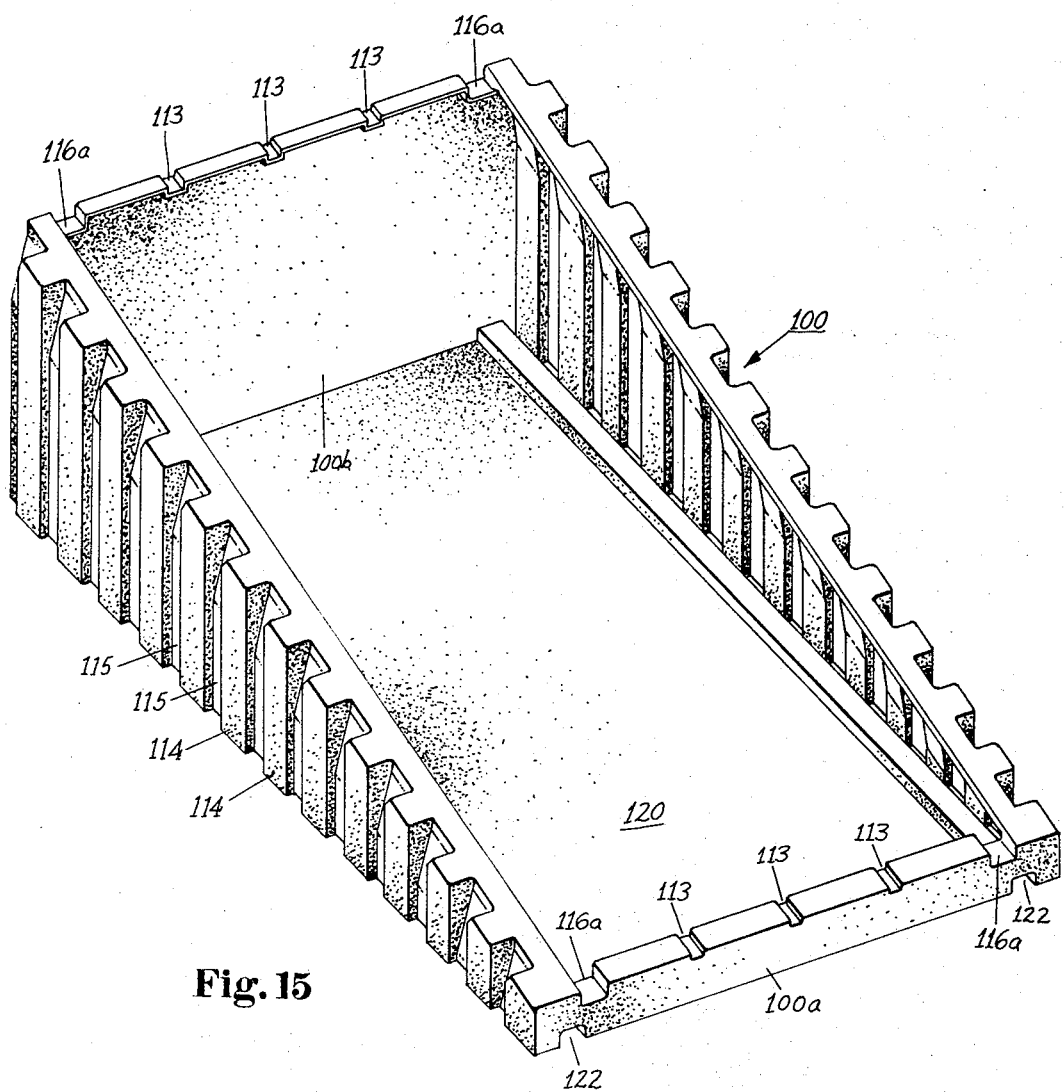

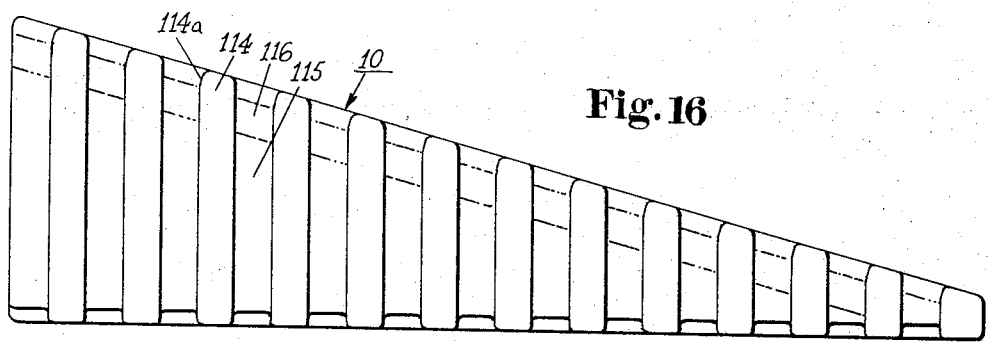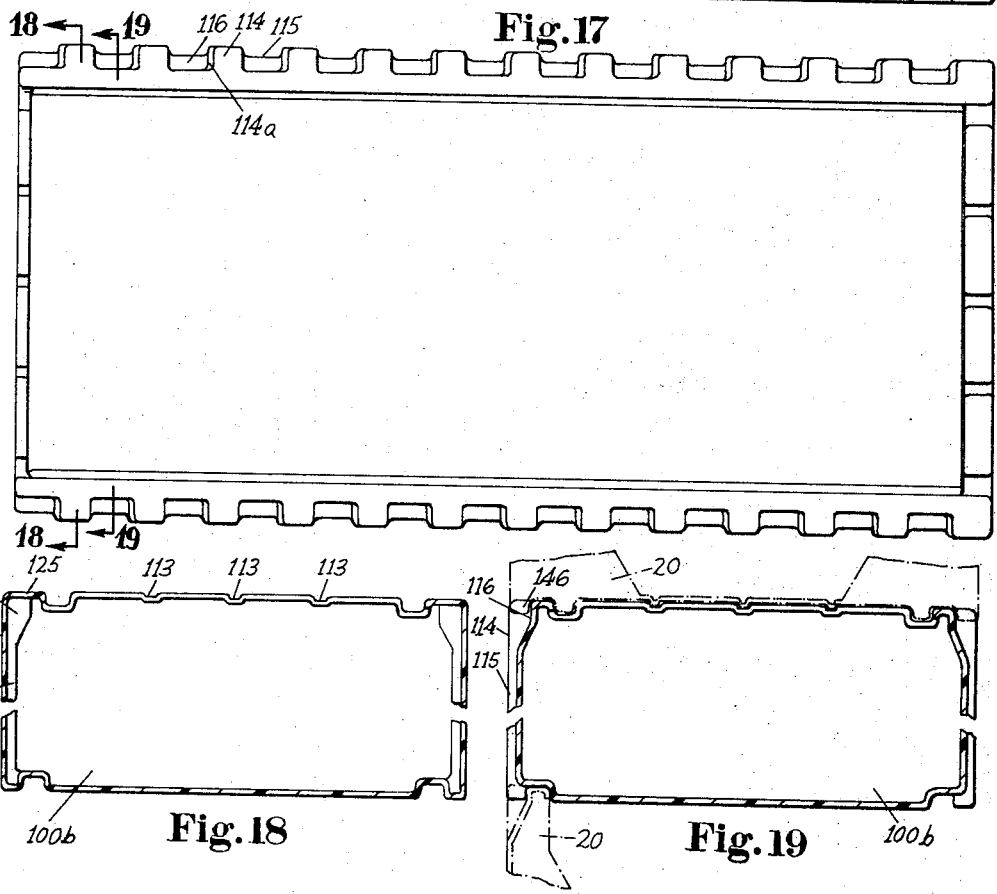

United States Patent Office 3,365,070
Patented Jan. 23, 1968

3,365,070
STACKABLE GRAVITY FLOW STOCK BIN
Robert F. Miles, Cincinnati, Ohio, assignor to MS Industries, Inc., a corporation of Ohio
Filed Sept. 24, 1965, Ser. No. 489,916
6 Claims. (Cl. 211—126)

ABSTRACT OF THE DISCLOSURE

A stock bin for holding small parts having stacking elements along the tops and bottoms of its side walls whereby a plurality of bins may be stacked one upon the other and a base element having stacking elements on the tops of its side edges and if desired also along the bottoms of the side edges, said base element being wedge shaped in side elevation whereby a plurality of bins may be stacked upon said base element to be disposed at an angle for gravity feed and whereby said base element may be stacked on top of one or more horizontally disposed bins so that other bins stacked on said base element will be disposed at an angle.

---

This invention relates to a stackable gravity flow stock bin. In many industries where a large number of small parts are kept in stock, it has been the practice to keep such parts in bins of one sort or another, the bins either being loose or being arranged on shelves from which they could be pulled out to gain access to the parts therein.

It is an object of the present invention to provide a gravity flow stock bin, i.e. one in which the parts will slide by gravity to the forward end of the bin for ready access and wherein any desired number of bins may be stacked one on top of the other in various arrangements as will be described in more detail hereinafter. To this end it is another object of the invention to provide a base member upon which a lowermost bin may be stacked and to provide on the base member and on the bottoms of the bins cooperating stacking elements. It is another object to provide at the top of each bin a conformation similar to that at the top of the base member so that a plurality of bins may be stacked one on top of the other.

Yet another object of the invention is to provide such cooperating stacking elements which will securely hold a base and a bin or two bins against displacement with respect to each other in any direction in a plane parallel to the bottoms thereof.

These and other objects of the invention which will be described in more detail are accomplished by that certain construction and arrangement of parts of which the following will describe an exemplary embodiment.

Reference is made to the drawings forming a part hereof and in which:

FIG. 15 is a perspective view of a modified base member.

FIG. 16 is an elevational view of the base member of FIG. 15.

FIG. 17 is a plan view of the modified base member.

FIG. 18 is a fragmentary cross sectional view taken on the line 18—18 of FIG. 17.

FIG. 19 is a fragmentary cross sectional view taken on the line 19—19 of FIG. 17.

Briefly, in the practice of the invention each bin is of elongated box-like shape open at the top and having a bottom wall, side walls and partial front and back end walls. Thus, openings are provided at each end of a bin so that when a plurality of bins are stacked upon each other access may be had to the contents of a bin without removing a superposed bin. The side walls are provided with a ribbed construction which will be described more in detail hereinafter, which provides for stacking engagement between the bottom of one bin and the top of another bin. The stacking elements are equally and closely spaced so that a pair of bins may be stacked together with their front and back end walls in alignment or in a staggered arrangement if this be desired.

A base member is provided, which is triangular in side elevation, so that its top surface is disposed at an acute angle to its bottom surface. The top edges of the base member at least are provided with stacking elements like those on the bins. Thus a base element may be placed upon the floor and a plurality of bins stacked on said base element whereby the bottom walls of all the bins will be disposed at an acute angle to the horizontal to provide for gravity flow. The stacking elements are so arranged, as will be described in more detail hereinafter, that a bin is locked to a base member or to another bin against movement in any direction in a plane parallel to a bin bottom so that a stack of bins will be secure and steady.

Referring now in more detail to the drawings, a base member is indicated generally at 10 in FIGS. 1 to 4. The bottom member and the bins to be described hereinafter may be stamped from sheet metal and welded where necessary or they may be formed from a suitable thermosetting plastic.

Figure 1:
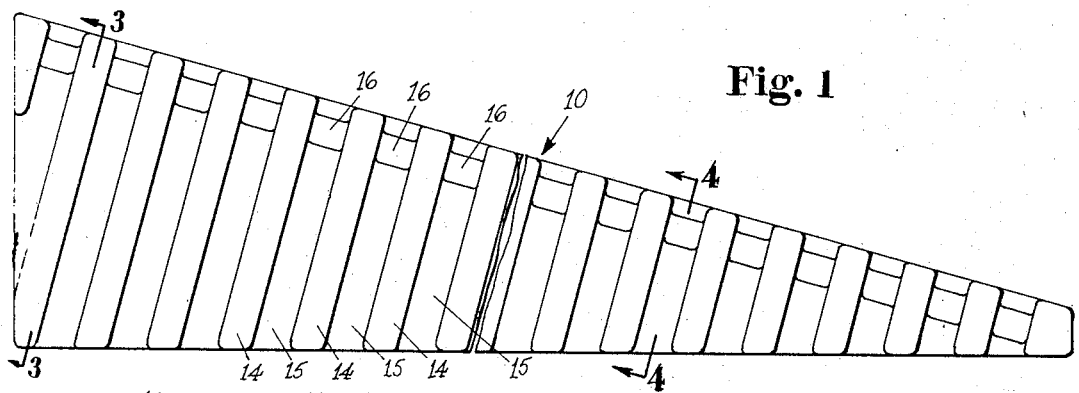
FIG. 1 is an elevational view of a base member.
Figure 2:
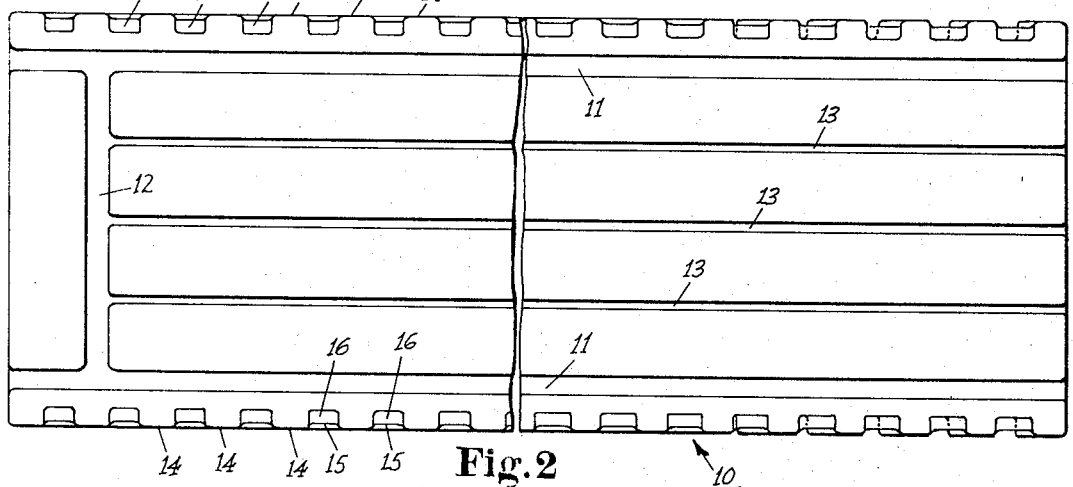
FIG. 2 is a plan view of the same looking in a direction normal to the top surface thereof.
Figures 3, 4:
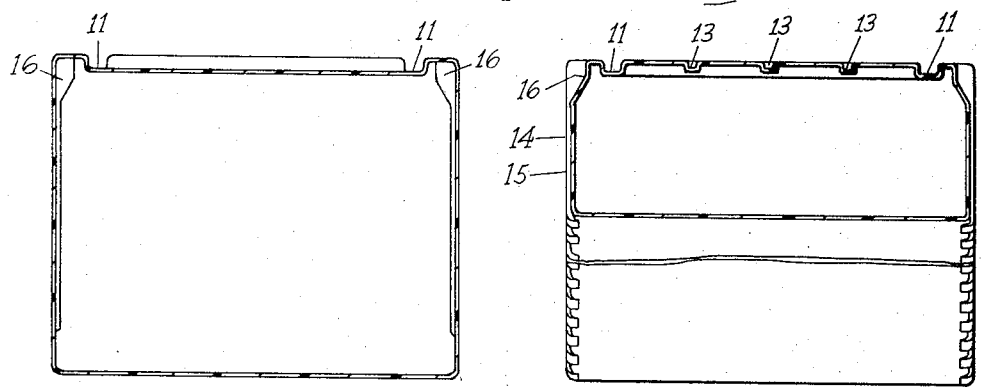
FIG. 3 is a cross sectional view thereof taken on the line 3—3 of FIG. 1.
FIG. 4 is a cross sectional view thereof taken on the line 4—4 of FIG. 1.
Figure 5:
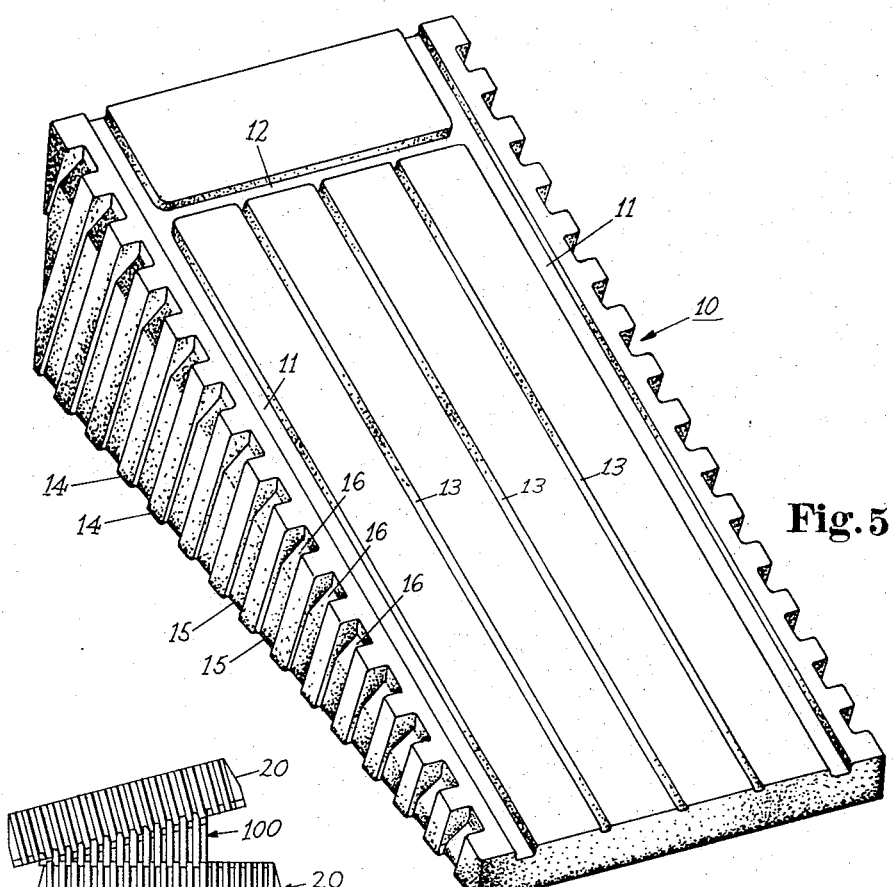
FIG. 5 is a perspective view of a base member of FIGS. 1–4.

The upper surface of the base member, best seen in FIG. 5, is substantially flat and is provided with the full length longitudinal grooves 11, a transverse groove 12, and a plurality of parallel longitudinal grooves 13. The side walls of the base member 10 are formed with outwardly projecting ribs 14 spaced apart with intervening depressed areas 15. At the top of the bottom member the depressed areas 15 are further indented as at 16.

Turning now to FIGS. 6 to 12a inclusive, a bin is indicated generally at 20 and it is provided with the side walls 21, the bottom wall 22 and the partial front end walls 23 and the partial rear end wall 24. The side walls 21 are provided with the outwardly extending ribs 14a separated by the depressed areas 15a and the depressed areas at the upper end thereof are further indented as at 16a. The upper edges of the side walls 21 are also provided with the inwardly turned flanges 25. By reference to FIGS. 9 to 12 inclusive, it will be observed that the ribs 14a extend below the bottom 22 of the bin to provide for a row of feet 14b. Along each side of the bottom parallel to the rows of feet 14b there are provided longitudinal downwardly projecting ridges 26 which are spaced from the rows of feet 14b so that when stacked the ridges 26 engage inside the longitudinal flanges 25. The manner of engagement is most clearly seen in the fragmentary view of FIG. 12a which shows the relation of the parts with one bin stacked upon another as viewed on the section line 12—12 of FIG. 7.

With the foregoing description of the details of construction, it is believed that the manner of use of the base and bins will be understood. By virtue of the fact that the ribs 14a are evenly spaced and the depressed areas 15a are slightly wider than the ribs 14a, the several feet 14b of one bin may be engaged in the indented portions 16a of a lower bin such that the engagement between the feet and indentations prevent forward and rearward shifting and the contact between the ridges 26 and the flanges 25 prevent lateral shifting.

Figures 13, 14:
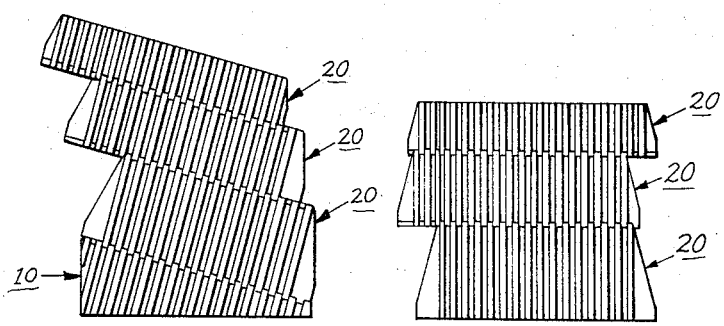
FIG. 13 is an elevational view of a number of bins stacked upon a base member.
FIG. 14 is an elevational view showing a number of bins in stacked relation without a base member.
Figure 6:
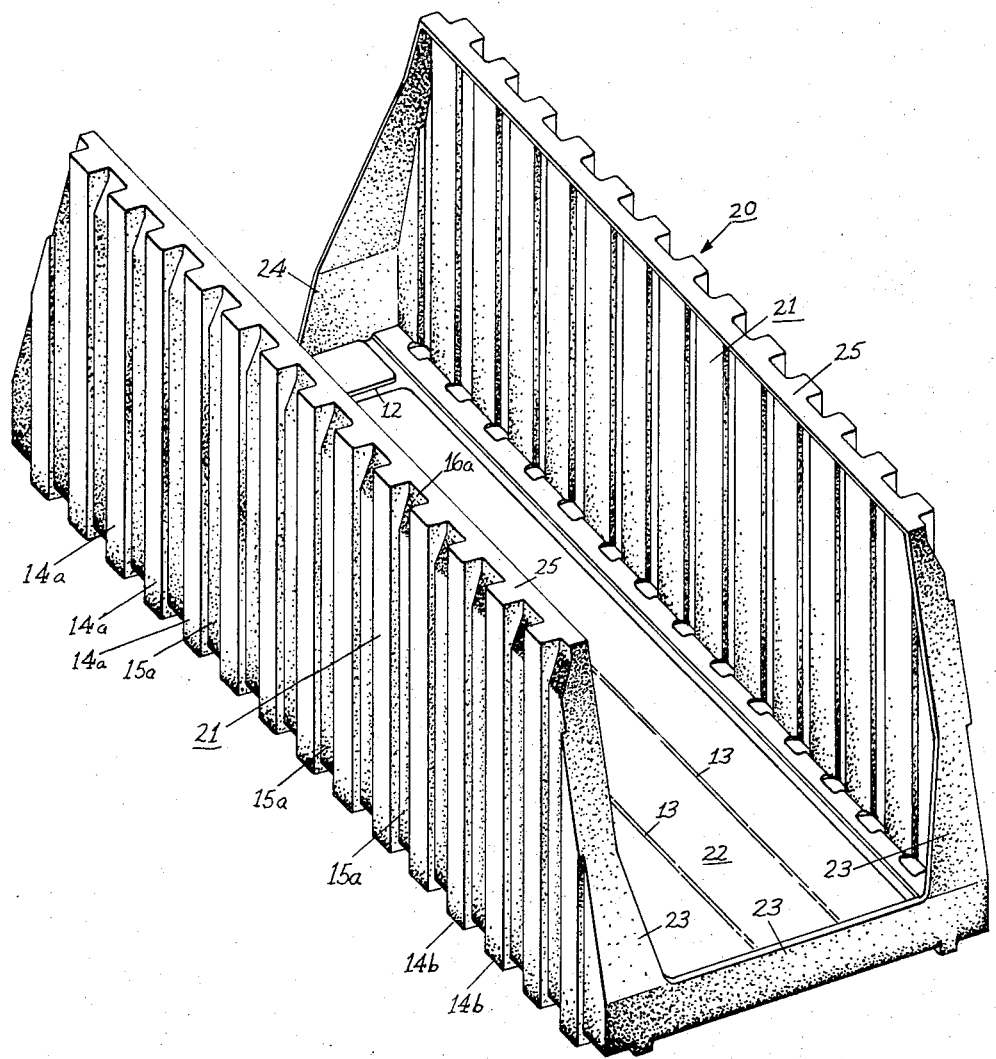
FIG. 6 is a perspective view of a typical bin.
Figure 7:
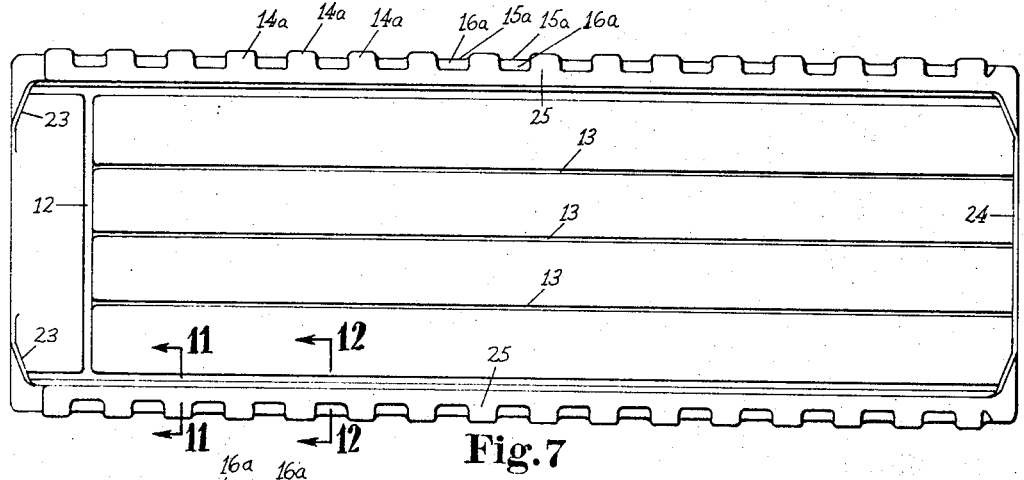
FIG. 7 is a plan view of a bin.
Figure 8:
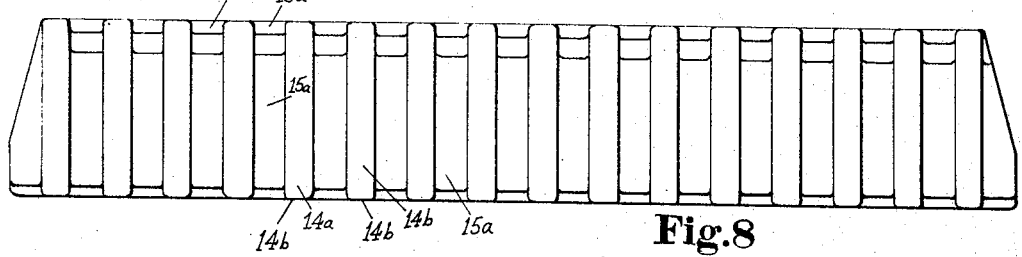
FIG. 8 is an elevational view of the same.
Figures 9, 10:
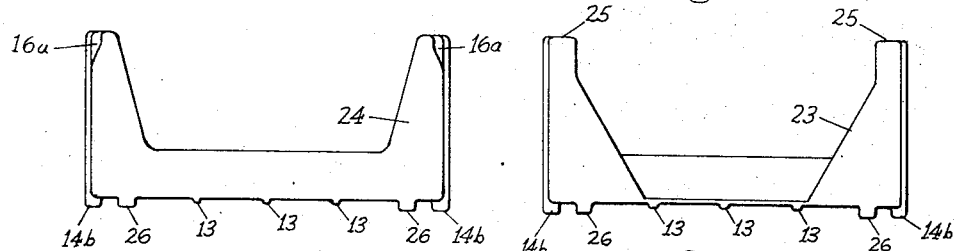
FIG. 9 is an end elevational view as seen from the right of FIG. 8.
FIG. 10 is an end elevational view as seen from the left of FIG. 8.
Figure 11:
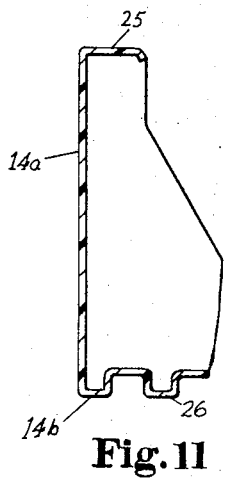
FIG. 11 is a fragmentary cross sectional view on an enlarged scale taken on the line 11—11 of FIG. 7.
Figure 12:
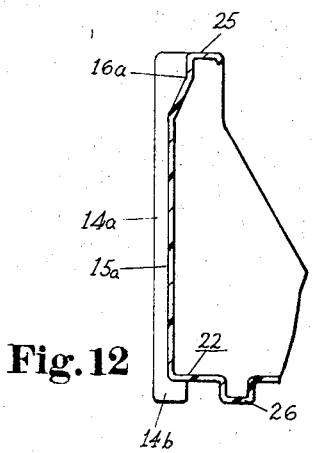
FIG. 12 is a view similar to FIG. 11 taken on the line 12—12 of FIG. 7.
Figure 12A:
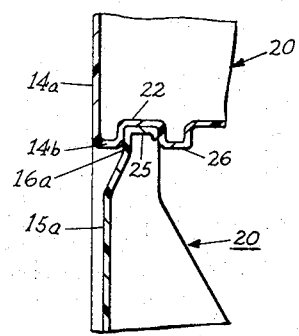
FIG. 12a is a fragmentary view showing two bins stacked on top of each other as they would appear on the line 11—11 of FIG. 7.

A plurality of bins 20 may thus be stacked one on top of the other on the floor as shown in FIG. 14, with the bottoms of the bins horizontally disposed and from FIG. 14 it will be clear that any bin may be stacked in a number of positions with respect to an adjacent bin so that the fronts of the bins may be aligned in a vertical plane or such that the fronts of the bins may be caused to slope rearwardly by any desired degree.

Similarly, it will be clear that if it is desired to provide for gravity flow a plurality of bins 20 may be stacked upon a base member 10, whereupon the bottom surface of each bin will be disposed at an acute angle to the horizontal. Here again the relationship between superposed bins may be varied so as to make the front edges of the bins all come in a vertical plane or slope rearwardly as shown in FIG. 13.

While it will normally not be desired to do so, it is certainly possible and entirely within the scope of the invention to provide a base member which can be inserted in the middle of a stack of bins. The modifications necessary are shown in FIGS. 15 to 19 inclusive. It will also be understood that the modified base member of FIGS. 15 to 19 inclusive may be used in the same manner as the base member of FIGS. 1 to 5 inclusive. The modified base member is generally indicated at 100 and the first modification which will be apparent is that instead of a solid upper surface it is open and the grooves 13 are provided as notches 113 in the front wall 100a and the rear wall 100b. The side walls are provided with the ribs 114 and the intermediate grooves 115 except that these ribs and grooves run vertically rather than at an angle as was the case with the base member 10. Thus, the bottom configuration of the members 114 and 115 is such that the base member 100 may be stacked on top of one of the bins 20 as indicated in broken lines in FIG. 19. At the top there are provided the indentations 116 which correspond to the indentations 16. The same inturned flange 125 is provided, corresponding to the inturned flange 25, and the upper ends of the ribs 114 are beveled as at 114a so that the foot members 14b of a bin may engage therein in an angularly related position. The front and rear walls 100a and 100b are also provided with the notches 116a to accommodate the feet 14b of a superposed bin. For strength, the modified base member may be provided with a bottom 120 and channels 122 are provided to correspond to the channels 22 of the bins 20. The lower surfaces of the walls 100a and 100b thus engage behind the flanges 25 of a bin upon which they are stacked.

Figure 20:
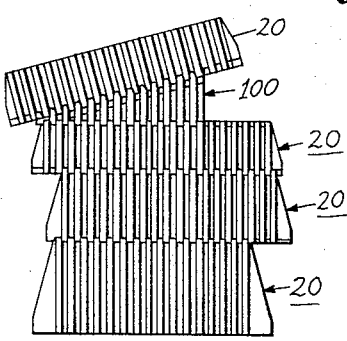
FIG. 20 is a view similar to FIGS. 13 and 14 showing the modified base member in use.

The use of the modified base member is exemplified in FIG. 20 where three bins 20 are shown stacked horizontally upon the floor as in FIG. 14 and the modified base member 100 is stacked upon the uppermost of these bins 20 and then additional bins 20 may be stacked on top of the base member 100. Thus, it is possible not only to have all the bins arranged for gravity flow as in FIG. 13 or to have none of them arranged for gravity flow as in FIG. 14, or to have some arranged for no gravity flow and others for gravity flow as shown in FIG. 20.

It will be understood that the notches 113 serve to accommodate the ridges 13 in the bottom of a bin 20 and thus assist at holding the separate pieces in a fixed location with relation to each other.

It will be clear that numerous modifications may be made without departing from the spirit of the invention and that therefore no limitation is intended which is not clearly set forth in the claims.

The embodiments of the invention in which an exclusive property or privilege is claimed are defined as follows:

1. A stackable bin of generally elongated box-like shape, open at the top and having a bottom wall, side walls, and partial front and back end walls, the upper edges of said side walls each having an inwardly facing flange, and said side walls having spaced vertical outwardly extending ribs with depressed areas between said ribs, said ribs at their lower ends extending beyond the bottom wall of said bin to constitute a row of feet along each side of said bottom wall, said depressed areas terminating at the said bottom wall and having further indentations at the top, the said further indentations extending downwardly a sufficient distance to accommodate the said rows of feet of a like bin stacked thereon, and a longitudinal downwardly projecting ridge along the underside of said bottom wall on each side, spaced inwardly from said rows of feet, to engage behind the said inwardly facing flanges of a like bin upon which said bin is stacked.

2. A base member for a stack of bins, said base member having a bottom surface, a top surface of a shape similar to the bottom wall of one of said bins, said top surface being disposed at an acute angle to said bottom surface, and side walls which are therefore generally triangular in elevation, the upper portions, at least, of said side walls, being configured like the upper portions of the side walls of said bin, whereby a bin may be stacked upon said base member and thus be disposed at an angle to the horizontal, for gravity flow.

3. A stack of bins comprising the combination of a plurality of superposed individual bins according to claim 1, the said feet of an upper bin being engaged in the said further indentations of a lower bin, and the said ridges of an upper bin being engaged behind said inwardly facing flanges of a lower bin, whereby said bins are locked together against relative movement in any direction in planes parallel to their bottom walls.

4. A stack of bins comprising the combination of a plurality of superposed individual bins according to claim 1, the said feet of an upper bin being engaged in the said further indentations of a lower bin, and the said ridges of an upper bin being engaged behind said inwardly facing flanges of a lower bin; said stack in combination with a base member having a bottom surface, a top surface of a shape similar to the bottom wall of one of said bins, said top surface being disposed at an acute angle to said bottom surface, and said walls which are therefore generally triangular in elevation, the upper portions, at least, of said side walls being configured like the upper portions of the side walls of said bins; the lowermost bin of said stack being stacked on said base member in the same way as the bins in said stack are stacked upon each other.

5. A base member for a stack of bins, said base member having a bottom surface, and a partial top surface at least, said top surface being disposed at an acute angle to said bottom surface, side walls which are therefore generally triangular in elevation, a row of equally spaced stacking elements along the top and bottom of each side wall of said base member, said rows of stacking elements respectively duplicating those along the tops and bottoms of the side walls of said bins, whereby said base member may be stacked upon a bin and whereby a bin may be stacked upon said base member such that bins stacked on top of said base member will be disposed at an angle to the horizontal for gravity flow.

6. A stack of bins comprising the combination of a plurality of superposed individual bins according to claim 1, the said rows of stacking elements along the tops of the side walls of a lower of two superposed bins being engaged with the rows of stacking elements along the bottoms of the side walls of an upper of said two superposed bins; said stack in combination with a base member having top and bottom stacking elements similar respectively to the top and bottom stacking elements of said bins, and the said top stacking elements of said base member being disposed in rows along the sides thereof at an acute angle to the said bottom stacking elements of said base member, said base member being disposed on top of a bin in said stack and the remaining bins in said stack being disposed in stacking relation on top of said base member, said base member being stacked with respect to the adjacent upper or lower bins in the same way as the bins in said stack are stacked upon each other.

References Cited
UNITED STATES PATENTS

| | | |
|---|---|---|
| 2,456,481 | 12/1948 | Ballantyne et al. |
| 1,112,943 | 10/1914 | Stone. |
| 1,678,443 | 7/1928 | Proctor et al. |
| 1,849,659 | 3/1932 | Burks. |
| 3,172,562 | 3/1965 | Mascher et al. _____ 220—97 |
| 3,252,614 | 5/1966 | Evans _____ 211—126 X |

ROY D. FRAZIER, *Primary Examiner.*